United States Patent [19]

Maesaka et al.

[11] Patent Number: 4,683,639
[45] Date of Patent: Aug. 4, 1987

[54] METHOD OF MANUFACTURING AN ELECTROLYTIC DOUBLE-LAYER CAPACITOR

[75] Inventors: Michinobu Maesaka; Koichi Watanabe; Michihiro Murata, all of Nagaokakyo, Japan

[73] Assignee: Murata Manufacturing Co., Ltd., Japan

[21] Appl. No.: 860,536

[22] Filed: May 7, 1986

[30] Foreign Application Priority Data

May 11, 1985 [JP] Japan .................................. 60-100155

[51] Int. Cl.$^4$ ............................................. H01G 9/00
[52] U.S. Cl. ................................. 29/570.1; 361/433; 437/919
[58] Field of Search ........................... 29/570; 361/433

[56] References Cited

U.S. PATENT DOCUMENTS 3,648,126 3/1972 Boos et al. ..................... 29/570 X
4,327,400 4/1982 Muranaka et al. ............... 29/570 X
4,394,713 7/1983 Yoshida ........................... 361/433
4,604,788 8/1986 Boos ................................ 29/570
4,626,964 12/1986 Azuma et al. .................. 29/570 X Primary Examiner—George T. Ozaki
Attorney, Agent, or Firm—Ostrolenk, Faber, Gerb & Soffen

[57] ABSTRACT

A method of manufacturing an electrolytic double-layer capacitor comprises steps of forming a laminated intermediate member in which an insulating gasket defines a central space containing a carbonaceous compact having a recess portion; and the insulating gasket is interposed between a separator, having a region provided with no liquid column of an electrolytic solution in a position corresponding to the recess portion, and a conductive sheet; and dripping the electrolytic solution from above the above mentioned region of the separator and then deforming the conductive sheet by negative pressure so as to cause the electrolytic solution to impregnate the compact.

5 Claims, 8 Drawing Figures

4,683,639

METHOD OF MANUFACTURING AN ELECTROLYTIC DOUBLE-LAYER CAPACITOR

BACKGROUND OF THE INVENTION

1. Field of the Invention

The present invention relates to a method of manufacturing an electrolytic double-layer capacitor, and more particularly, it relates to a method of manufacturing an electrolytic double-layer capacitor employing carbonaceous compacts as polarizable electrodes.

2. Description of the Prior Art

FIG. 2 is a sectional view showing an example of an electrolytic double-layer capacitor in the background of the present invention.

A conventional electrolytic double-layer capacitor 1 includes an ion-permeable electric insulating separator 2. Ring-shaped insulating members or gaskets 3 and 4 are fixed to the upper and lower surfaces of the separator 2. Polarizable electrodes 5 and 6 are contained in spaces defined by the insulating members 3 and 4. The polarizable electrodes 5 and 6 are prepared from, e.g., a mixed paste of activated carbon powder and an electrolytic solution containing sulfuric acid etc. That is, the polarizable electrodes 5 and 6 in the form of paste are formed by filling in the spaces defined by the insulating members 3 and 4. A conductive sheet 7 for forming one collective electrode is adhered to the outer of the insulating member 3. A conductive sheet 8 for forming another collective electrode is adhered to the outer of the insulating member 4. Thus, the polarizable electrodes 5 and 6 are sealed by the conductive sheets 7 and 8.

In an electrolytic double-layer capacitor, contact surfaces of the polarizable electrodes and the conductive sheets must be securely in contact with each other. Therefore, the conventional electrolytic double-layer capacitor has generally been sealed under decompression.

However, a conventional method of sealing the electrolytic double-layer capacitor under decompression is complicated since the spaces containing the opposite two polarizable electrodes and separated by the separator must be sealed and bonded under decompression. Further, complete air tightness may not be obtained even if the electrolytic double-layer capacitor is sealed under decompression, whereby problems due to leakage etc. are increased.

SUMMARY OF THE INVENTION

Accordingly, the principal object of the present invention is to provide a method of effectively manufacturing an electrolytic double-layer capacitor.

The present invention comprises steps of respectively preparing a flat-shaped compact of carbonaceous material having a recess portion partially formed therein, an ion-permeable separator having a region provided with no liquid column of an electrolytic solution in a position corresponding to the recess portion of the compact, a conductive sheet and an insulating member for containing the compact.

The above-mentioned region provided with no liquid column of an electrolytic solution, is a region wherein there is no body of electrolytic solution connecting the two opposite surfaces of the separator in the thickness direction of the separator. That is, even if through holes, as described hereinbelow, are formed in the separator, the surfaces of the separator are not electrically connected to each other by an electrolytic solution.

The present invention further includes a step of forming a laminated intermediate member in which the insulating member is interposed between the separator and the conductive sheet to contain the compact in a space defined by the insulating member and a step of dripping an electrolytic solution from above the separator and deforming or drawing down the conductive sheet by negative pressure, so as to cause the electrolytic solution to impregnate in the compact.

The compact of carbonaceous material is contained in the space defined by the insulating member on one side of the separator and the conductive sheet is adhered to the outer surface of the insulating member to seal the compact. The electrolytic solution is dripped from above the separator and then the conductive sheet is deformed by negative pressure, thereby to impregnate the electrolytic solution to impregnate the compact to define a polarizable elecrode.

According to the invention, only one layer interface is laminated and adhered under decompression, whereby the electrolytic double-layer capacitor is simplified in handling and manufacturing. Further, the space for containing one polarizable electrode completely seals the periphery of the compact in a dry state, thereby to reduce the fraction of defective parts.

These and other objects, features, aspects and advantages of the present invention will become more apparent from the following detailed description of a preferred embodiment of the present invention when taken in conjunction with the accompanying drawings.

BRIEF DESCRIPTION OF THE DRAWINGS

FIGS. 1A to 1G illustrate manufacturing steps according to an embodiment of the present invention, in which FIG. 1A shows a step of preparing a tablet, FIG. 1B shows a step of bonding a separator and insulating members, FIG. 1C shows steps of preparing a conductive sheet and forming a laminated intermediate member by laminating the conductive sheet, insulating members, tablet and separator, FIG. 1D shows the laminated intermediate member in an inverted state, FIG. 1E shows a step of impregnating an electrolytic solution in one tablet, FIG. 1F shows a step of bonding and sealing another conductive sheet under decompression and FIG. 1G shows an electrolytic double-layer capacitor element in a sealed state.

DESCRIPTION OF THE PREFERRED EMBODIMENT

FIGS. 1A to 1G illustrate manufacturing steps according to an embodiment of the present invention.

Figure 1A:
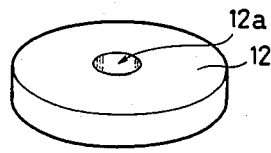

As shown in FIG. 1A, a tablet 12 formed of a mixed compact of carbonaceous powder and a binder is first prepared. The tablet 12 is formed with the external shape of a circular flat plate, and formed in, e.g., its center is a through-hole 12a which serves as a recess portion. The recess portion need not be a through-hole, for example, it may be a recess extending inwardly from the periphery of the tablet 12. The recess portion also need not be formed in the center, as is the through-hole 12a. In practice, the tablet 12 is prepared from a mixture of carbonaceous powder such as activated carbon powder and an emulsion, and such mixed compact is obtained by the following process: Dispersive activated carbon powder dispersed in a solvent is mixed with dispersive latex dispersed in a solvent, and then the solvents are removed from the mixed solution thereby to obtain an aggregated mixture. Then the mixture is temporarily pulverized, and the pulverized substance is pelletized. Thereafter the pelletized powder is pressurized by a press etc. to obtain a mixed compact, i.e., the tablet 12. Then, in a subsequent step, an electrolytic solution is impregnated in the tablet 12, which in turn serves as a polarizable electrode.

The tablet 12 forming the body of the polarizable electrode may also be prepared from carbon powder formed in the shape of a sheet of fibrous activated carbon cloth.

Figure 1B:
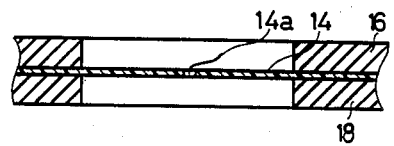

Then, as shown in FIG. 1B, the next step is preparing a separator 14 and insulating members or gaskets 16 and 18 provided with holes. The separator 14 is formed from ion-permeable and electron-impermeable, i.e., electrically insulative, material such as nonwoven fabric of polyolefin, such as polyethylene or polypropylene, or machine-made paper such as kraft paper of Manila paper with cellulose etc. The separator 14 is formed with a through-hole 14a which is smaller than the through-hole 12a of the tablet 12, at least in a position corresponding to the through-hole 12a. The through-hole 14a is adapted to define a region provided with no liquid column of an electrolytic solution in the separator 14. The size of the through-hole 14a depends on the thickness and the external size of the separator 14, and is selected to be within a range of, e.g., 0.2 to 0.5 mm in diameter.

In addition to the through-hole 14a artificially formed in the separator 14, the region provided with no liquid column includes a porous part having no affinity to the electrolytic solution in the porous separator. That is, in this region, the two surfaces of the separator are connected to each other by pores. This is a region provided with no liquid column of an electrolytic solution, as described hereinabove. More specifically, in this region, no electrolytic solution is provided passing from one major surface to the other major surface of the separator 14.

The inner diameters of the insulating members 16 and 18 are selected to be large enough to contain the tablet 12 in spaces defined by the inner walls of the members 16 and 18. Further, the insulating members 16 and 18 are selected to be substantially identical in thickness to the tablet 12. The two insulating member 16 and 18 are respectively fixed to both surfaces of the separator 14 by, e.g., an adhesive agent as shown in FIG. 1B.

Figure 1C:
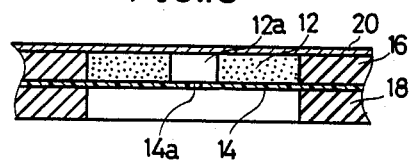

Then the tablet 12 is contained in the space defined by the separator 14 and the insulating member 16. Thereafter a conductive sheet 20 is adhered to the outer surface of the insulating member 16 by, e.g., an adhesive agent as shown in FIG. 1C. Thus, the tablet 12 is contained in the space defined by one surface of the separator 14 and the insulating member 16, thereby to form a laminated intermediate member.

Figure 1D:
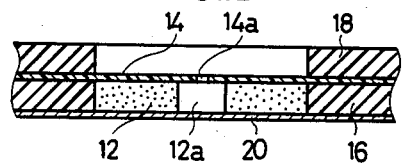
Figure 1E:
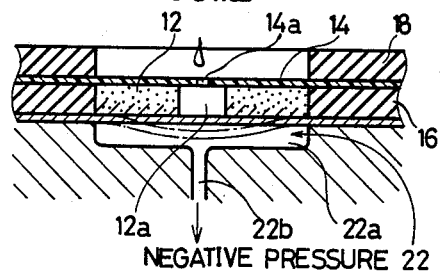
Figure 1F:
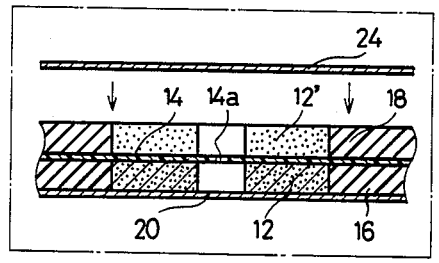

Then the laminated intermediate member is inverted as shown in FIG. 1D, to be placed on a table 22 as shown in FIG. 1E. The table 22 is provided with a concavity 22a substantially in the same flat form as the tablet 12, and a path 22b is formed in the concavity 22a to communicate with a negative pressure source (not shown). In this state, an electrolytic solution of sulfuric acid etc. is dripped from a position above the through-hole 14a of the separator 14. Then the negative pressure source is driven to partially evacuate the concavity 22a whereby the conductive sheet 20 is bent or displaced as shown by the double chain line in FIG. 1E. Thus, the electrolytic solution is collectied in the through-hole 12a to be impregnated in the tablet 12. In this stage, most of the electrolytic solution placed on the separator 14 is guided to the through-hole 12a of the tablet 12 contained in the spaced defined by the insulating member 16 through-hole 14a. The electrolytic solution is impregnated in the tablet 12 while the conductive sheet 20 is temporarily downwardly displaced by the negative pressure. In this case, the through-hole 12a of the tablet 12 defines a gap region within the space defined by the insulating member 16 so that the tablet 12 itself is increased in surface area in comparison with the case where no through-hole 12a provided, thereby to facilitate permeation of the electrolytic solution, which sufficiently permeates into the interior of the tablet 12. Thereafter the conductive sheet 20 is released from displacement by the negative pressure source. The tablet 12 thus impregnated with the electrolytic solution serves as a polarizable electrode.

Figure 1G:
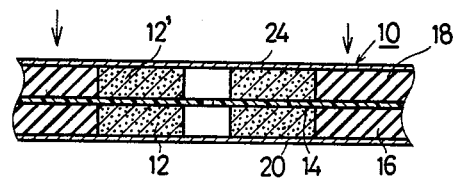
Figure 2:
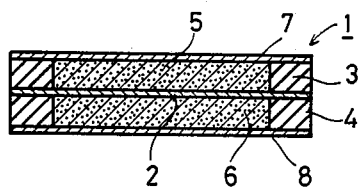
FIG. 2 is a sectional view showing an example of an electrolytic double-layer capacitor in the background of the present invention.

In the laminated intermediate member having the tablet 12 thus impregnated with the electrolytic solution, another tablet 12' is inserted in an opposite space defined by the separator 14 and the insulating member 18. This tablet 12' serves as another polarizable electrode. The laminated intermediate member is introduced into a chamber under decompression to less than 100 Torr. as shown by the chain line in FIG. 1F. In the step shown in FIG. 1F, residual air in the space containing the lower tablet 12 is discharged through the through-hole 14a of the separator 14, and hence the through-hole 14a also serves to decompress the lower space, i.e., the space in which the tablet 12 is already sealed as the polarizable electrode. In this state, a conductive sheet 24 is adhered to the outer surface of the insulating member 18 by an adhesive agent etc. as shown in FIG. 1G. Thus, the two tablets 12 and 12' are sealed by the insulating members 16 and 18 and the conductive sheets 20 and 24 on both sides of the separator 14. In this stage, any excessive part of the electrolytic solution impregnated in the tablet 12 is further impregnated in the other tablet 12' through the through-hole 14a. Thereafter the laminated intermediate member is cut in portions shown by arrows in FIG. 1G, thereby to obtain an electric double-layer capacitor 10.

A required number of thus formed electric double-layer capacitors 10 may be stacked and contained in a can (not shown), to be provided with outer terminals (not shown).

As hereinabove described, the tablet 12 of carbonaceous material is impregnated with the electrolytic solution to form a polarizable electrode, whereby the operation in the decompression chamber is simplified in comparison with the conventional method of filling spaces with a paste. Thus, the method avoids manufacturing complications and the electric double-layer capacitor can be efficiently manufactured. Further, the gap region is formed by the through-hole 12a of the tablet 12 in the space defined by the insulating member, whereby any gas generated upon application of voltage exceeding endurable levels is conducted into the gap region. Thus the internal pressure of the insulating member is not increased, which would damage adhesion of the polarizable electrode and the conductive sheet, while equivalent series resistance is not increased.

Although an embodiment of the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an electrolytic double-layer capacitor comprising the steps of:

preparing a flat-shaped compact of carbonaceous material having a recess portion formed therein;

preparing an ion-permeable separator having a region provided with no liquid column of an electrolytic solution in a position corresponding to said recess portion of said compact;

preparing a conductive sheet;

preparing an insulating member having a central aperture for defining a space for containing said compact;

forming a laminated intermediate member in which said insulating member is interposed between said separator and said conductive sheet to define said space for containing said compact; and dripping said electrolytic solution from above said region of said separator provided with no liquid column and then deforming said conductive sheet so as to cause said electrolytic solution to impregnate said compact.

2. A method of manufacturing an electrolytic double-layer capacitor in accordance with claim 1, wherein said step of preparing said separator includes a step of forming a through-hole which serves as a region provided with no liquid column of said electrolytic solution.

3. A method of manufacturing an electrolytic double-layer capacitor in accordance with claim 1 or claim 2, wherein said step of preparing said compact includes a step of forming a through-hole as said recess portion.

4. A method as in claim 1, including deforming said conductive sheet by applying negative pressure thereto.

5. A method as in claim 4, including providing a work table having a concavity therein communicating with a negative pressure source for applying said negative pressure.

* * * * *

UNITED STATES PATENT AND TRADEMARK OFFICE
CERTIFICATE OF CORRECTION

PATENT NO. : 4,683,639

DATED : August 4, 1987

INVENTOR(S) : Michinobu Maesaka et al.

It is certified that error appears in the above-identified patent and that said Letters Patent is hereby corrected as shown below:

Title page Item (54) should read

--METHOD OF MANUFACTURING AN ELECTRIC [ELECTROLYTIC] DOUBLE-LAYER CAPACITOR--

Signed and Sealed this

Twelfth Day of April, 1988

Attest:

DONALD J. QUIGG

Attesting Officer

Commissioner of Patents and Trademarks